United States Patent
Gu et al.

(10) Patent No.: US 11,526,863 B1
(45) Date of Patent: Dec. 13, 2022

(54) HYBRID AUTONOMOUS STORE

(71) Applicant: AiFi Corp, Santa Clara, CA (US)

(72) Inventors: Steve Gu, Santa Clara, CA (US); Ying Zheng, Santa Clara, CA (US); Joao Falcao, Santa Clara, CA (US)

(73) Assignee: AiFi Corp, Santa Clara, CA (US)

( * ) Notice: Subject to any disclaimer, the term of this patent is extended or adjusted under 35 U.S.C. 154(b) by 0 days.

(21) Appl. No.: 17/326,326

(22) Filed: May 21, 2021

(51) Int. Cl.
| | |
|---|---|
| *G06Q 30/00* | (2012.01) |
| *G06Q 20/18* | (2012.01) |
| *G06Q 30/06* | (2012.01) |
| *G06Q 20/36* | (2012.01) |
| *G07C 9/00* | (2020.01) |

(52) U.S. Cl.
CPC ......... *G06Q 20/18* (2013.01); *G06Q 20/3678* (2013.01); *G06Q 30/0601* (2013.01); *G07C 9/00563* (2013.01)

(58) Field of Classification Search
None
See application file for complete search history.

(56) References Cited

U.S. PATENT DOCUMENTS

| | | | | |
|---|---|---|---|---|
| 2003/0132298 A1* | 7/2003 | Swartz | ............... | G06Q 20/3276 235/472.02 |
| 2004/0015408 A1* | 1/2004 | Rauen, IV | ............. | G06Q 10/10 705/26.81 |
| 2004/0230484 A1* | 11/2004 | Greenlee | ............ | G06Q 30/0214 705/14.27 |
| 2011/0176705 A1* | 7/2011 | Kato | .................. | G06Q 20/3276 382/100 |
| 2012/0321146 A1* | 12/2012 | Kundu | ................. | G06Q 20/208 340/568.8 |
| 2015/0066712 A1* | 3/2015 | Altieri | .................. | G06Q 10/087 705/28 |
| 2018/0165728 A1* | 6/2018 | McDonald | ............. | G06V 20/52 |
| 2020/0140256 A1* | 5/2020 | Setchell | .................... | G01S 5/02 |
| 2020/0311731 A1* | 10/2020 | Maxilom | ................. | G07F 7/06 |
| 2021/0350446 A1* | 11/2021 | D'Haenens | .......... | G06Q 20/206 |
| 2022/0122701 A1* | 4/2022 | Frank | ..................... | G16H 20/60 |

* cited by examiner

*Primary Examiner* — Kambiz Abdi
*Assistant Examiner* — Christopher Stroud
(74) *Attorney, Agent, or Firm* — Jun Liu

(57) ABSTRACT

This application relates to systems, methods, devices, and other techniques for a hybrid autonomous store that can be utilized within a retail environment. This system with doors, cameras, and sensors is designed to have many functions within a store with identification system and sometimes can be utilized in a store with or without human cashier.

2 Claims, 3 Drawing Sheets

HYBRID AUTONOMOUS STORE

BACKGROUND OF THE INVENTION

This application relates to systems, methods, devices, and other techniques for a smart autonomous store system that can be utilized within a retail environment.

Methods and apparatus for using cameras in a retail store for monitoring products and customers are well known and in practices. However, systems, methods, devices, and other techniques for a system for a smart autonomous store that can be utilized within a retail environment need is new and could be combined with recently developed AI and machine learning and sensor technology.

Therefore, it is desirable to have systems, methods, devices, and other techniques for a smart autonomous store that can be utilized within a retail environment.

SUMMARY OF THE INVENTION

This application relates to systems, methods, devices, and other techniques for a smart autonomous store entry system that can be utilized within a retail environment.

This system with doors, cameras, and sensors is designed to have many functions within a store with identification system and sometimes can be utilized in a store with or without human cashier.

In some embodiments, the invention is related to a hybrid autonomous store, comprises: a server; an authentication device coupled to the server, wherein the authentication device is configured to obtain personal information from a user's identifying item when the user presents the user's identifying item within an area near entry of the hybrid autonomous store defined by a proximity sensor, wherein the area is invisible to a human eye, wherein the authentication device is configured to transmits the personal information to a server, wherein the authentication device is configured to receive authentication of the personal information from the server, wherein the user's identifying item can be an phone, a credit card, a membership card, a QR code or the user's biometrics information, wherein the user's biometrics information could come from palm scan, finger scan, Iris scan, or facial recognition scan, wherein the phone is configured to have an application with blue tooth or Wi-Fi-enabled verification, wherein the server is configured to regard the user as a VIP member; a display coupled to the hybrid autonomous store, wherein the display is configured to be viewable to persons outside of the hybrid autonomous store, wherein the display is configured to display promotional information specialized for the user after the authentication of the personal information from the server, wherein the display is configured to display a phrase of "welcome" in language pre-selected by the user; an entry door couple to the hybrid autonomous store and the server, wherein the entry door is configured to open when the authentication of the personal information from the server; an unattended checkout device coupled to the server, wherein the unattended checkout device is configured to conduct payment process of products the user carries, wherein the unattended checkout device is configured to send a paid message to the server when payment of the products is successful; a manager terminal coupled to the server, wherein the manager terminal is configured to be manned by a person, wherein the manager terminal is configured to checkout the user or communicate with the user when the user chooses to do so, wherein the manager terminal is configured to receive the paid message from the server, wherein the manager terminal is alerted when the user is trying to exit when the paid message is not received from the server, wherein a part of shop that is age restricted is configure to be disabled when the manager terminal is not functional, wherein the manager terminal is configured to process checkout process manually when another user does not present the another user's identifying information, wherein the server regards the another user as "non-VIP" customer; and a second gate control device coupled to the server, wherein the second gate control device is configured to open an exit gate for the VIP member the server receives the paid message.

In some embodiments, the unattended checkout device is configured to process payment from a Bitcoin wallet.

In some embodiments, the invention is related to A hybrid autonomous store system, comprises: a server; an authentication device coupled to the server, wherein the authentication device is configured to obtain personal information from a user's identifying item when the user presents the user's identifying item within an area near entry of the hybrid autonomous store defined by a proximity sensor, wherein the area is visible to a human eye by a colored boundary, wherein the authentication device is configured to transmits the personal information to a server, wherein the authentication device is configured to receive authentication of the personal information from the server, wherein the user's identifying item can be an phone, a credit card, a membership card, a QR code or the user's biometrics information, wherein the user's biometrics information could come from palm scan, finger scan, Iris scan, or facial recognition scan, wherein the phone is configured to have an application with blue tooth or Wi-Fi-enabled verification, wherein the server is configured to regard the user as a VIP member; a display coupled to the hybrid autonomous store, wherein the display is configured to be viewable to persons outside of the hybrid autonomous store, wherein the display is configured to display promotional information specialized for the user after the authentication of the personal information from the server, wherein the display is configured to display a phrase of "welcome" in language pre-selected by the user; an entry door couple to the hybrid autonomous store and the server, wherein the entry door is configured to open when the authentication of the personal information from the server; an unattended checkout device coupled to the server, wherein the unattended checkout device is configured to conduct payment process of products the user carries, wherein the unattended checkout device is configured to send a paid message to the server when payment of the products is successful, wherein the VIP member can exit after the said message is received; and a manager terminal coupled to the server, wherein the manager terminal is configured to be manned by a person, wherein the manager terminal is configured to checkout the user or communicate with the user when the user chooses to do so, wherein the manager terminal is configured to receive the paid message from, server, wherein the manager terminal is alerted when the user is trying to exit when the paid message is not received from the server, wherein a part of shop that is age restricted is configure to be disabled when the manager terminal is not functional, wherein the manager terminal is configured to process checkout process manually when another user does not present the another user's identifying information, wherein the server regards the another user as "non-VIP" customer.

In some embodiments, the unattended checkout device is configured to process payment from a Bitcoin wallet.

In some embodiments, the promotional information is configured to meet the user's personal taste.

In some embodiments, the invention is related to A hybrid autonomous store system, comprises: a server; an authentication device coupled to the server, wherein the authentication device is configured to obtain personal information from a user's identifying item when the user presents the user's identifying item, wherein the authentication device is configured to transmits the personal information to a server, wherein the authentication device is configured to receive authentication of the personal information from the server, wherein the user's identifying item can be an phone, a credit card, a membership card, a QR code or the user's biometrics information, wherein the user's biometrics information could come from palm scan, finger scan, Iris scan, or facial recognition scan, wherein the phone is configured to have an application with blue tooth or Wi-Fi-enabled verification, wherein the server is configured to regard the user as a VIP member; a display coupled to the hybrid autonomous store, wherein the display is configured to be viewable to persons outside of the hybrid autonomous store, wherein the display is configured to display promotional information specialized for the user after the authentication of the personal information from the server; an entry door couple to the hybrid autonomous store and the server, wherein the entry door is configured to open when the authentication of the personal information from the server; an unattended checkout device coupled to the server, wherein the unattended checkout device is configured to conduct payment process of products the user carries, wherein the unattended checkout device is configured to send a paid message to the server when payment of the products is successful; a manager terminal coupled to the server, wherein the manager terminal is configured to be manned by a person, wherein the manager terminal is configured to checkout the user or communicate with the user when the user chooses to do so, wherein the manager terminal is configured to receive the paid message from the server, wherein the manager terminal is alerted when the user is trying to exit when the paid message is not received from the server, wherein a part of shop that is age restricted is configure to be disabled when the manager terminal is not functional, wherein the manager terminal is configured to process checkout process manually when another user does not present the another user's identifying information, wherein the server regards the another user as "non-VIP" customer; a second gate control device coupled to the server, wherein the second gate control device is configured to open an exit gate for the VIP member the server receives the paid message; and another control gate coupled to the hybrid autonomous store, wherein the another control gate separates an age-restricted area from rest of the smart shop, wherein the another control gate is configured to restrict access to the age-restrict area unless the manager terminal is manned by a person and the personal information shows the user is older than the legal age to access the age-restricted area.

In some embodiments, the unattended checkout device is configured to process payment from a Bitcoin wallet.

In some embodiments, the promotional information is configured to meet the user's personal taste.

These and other aspects, their implementations and other features are described in details in the drawings, the description and the claims.

BRIEF DESCRIPTION OF THE DRAWINGS

FIG. 2 shows another example of a hybrid autonomous store.

DETAILED DESCRIPTION OF THE INVENTION

Figure 1:
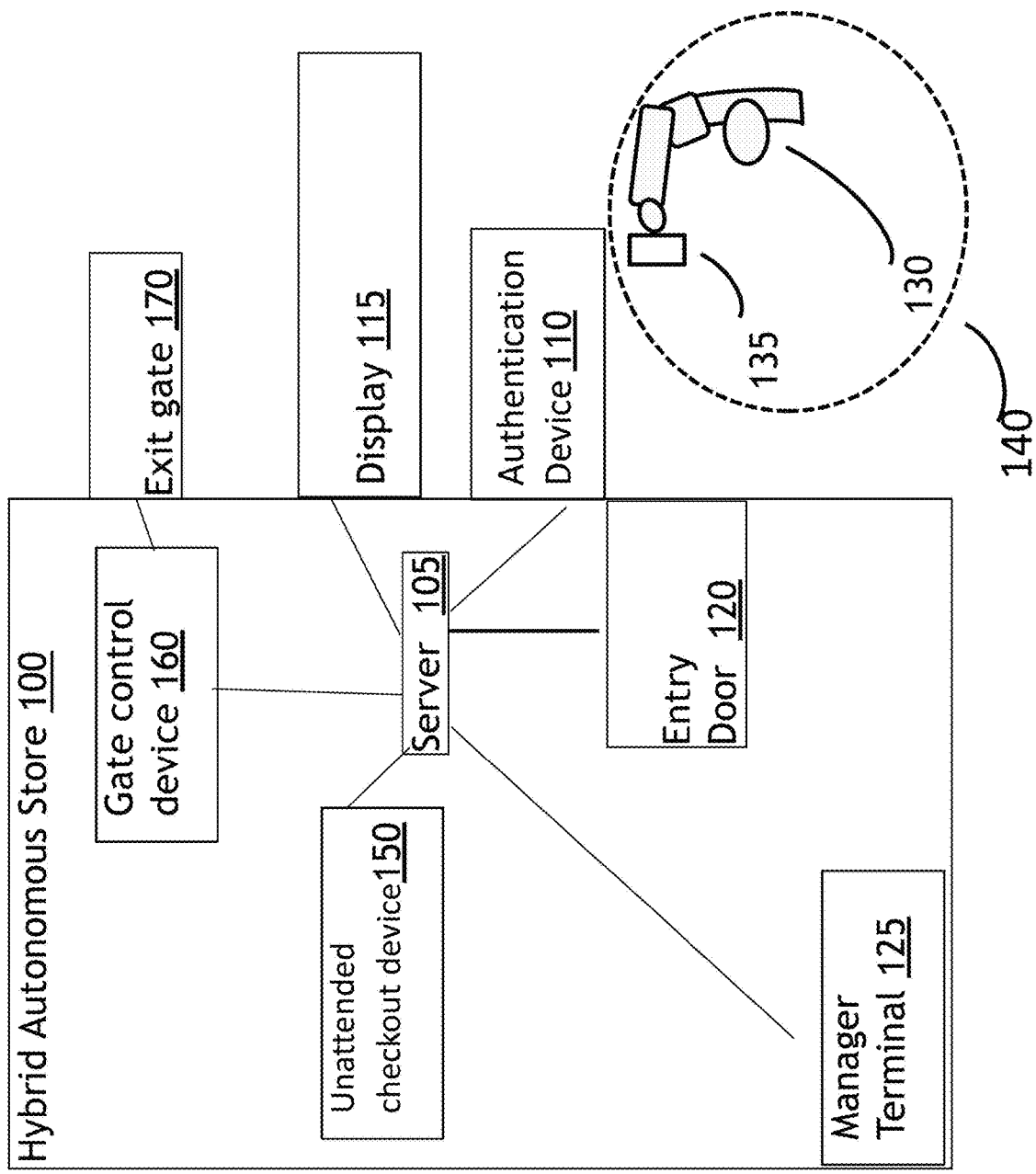

FIG. 1 shows an example of a hybrid autonomous store 100.

In some implementations, a hybrid autonomous store 100, comprises: a server 105; an authentication device 110 coupled to the server 105, wherein the authentication device 110 is configured to obtain personal information from a user's 130 identifying item 135 when the user presents the user's identifying item 135 within an area 140 near entry of the hybrid autonomous store 100 defined by a proximity sensor, wherein the area is invisible to a human eye, wherein the authentication device is configured to transmits the personal information to the server, wherein the authentication device is configured to receive authentication of the personal information from the server, wherein the user's identifying item 135 can be an phone, a credit card, a membership card, a QR code or the user's biometrics information, wherein the user's biometrics information could come from palm scan, finger scan, Iris scan, or facial recognition scan, wherein the phone is configured to have an application with blue tooth or Wi-Fi-enabled verification, wherein the server is configured to regard the user as a VIP member; a display 115 coupled to the hybrid autonomous store, wherein the display 115 is configured to be viewable to persons outside of the hybrid autonomous store, wherein the display is configured to display promotional information specialized for the user after the authentication of the personal information from the server, wherein the display is configured to display a phrase of "welcome" in language pre-selected by the user, an entry door 120 couple to the hybrid autonomous store 100 and the server 105, wherein the entry door 120 is configured to open when the authentication of the personal information from the server; an unattended checkout device 150 coupled to the server, wherein the unattended checkout device 150 is configured to conduct payment process of products the user carries, wherein the unattended checkout device 150 is configured to send a paid message to the server when payment of the products is successful; a manager terminal 125 coupled to the server, wherein the manager terminal 125 is configured to be manned by a person, wherein the manager terminal 125 is configured to checkout the user or communicate with the user when the user chooses to do so, wherein the manager terminal 125 is configured to receive the paid message from the server, wherein the manager terminal is alerted when the user is trying to exit when the paid message is not received from the server, wherein a part of shop that is age restricted is configure to be disabled when the manager terminal is not functional, wherein the manager terminal is configured to process checkout process manually when another user does not present the another user's identifying information, wherein the server regards the another user as "non-VIP" customer; and a second gate control device 160 coupled to the server, wherein the second gate control device is configured to open an exit gate 170 for the VIP member the server receives the paid message.

In some embodiments, the unattended checkout device is configured to process payment from a Bitcoin wallet.

In some embodiments, the pre-determined time is from 8 am to 5 pm.

In some embodiments, the promotional information is configured to meet the user's personal taste.

Figure 2:
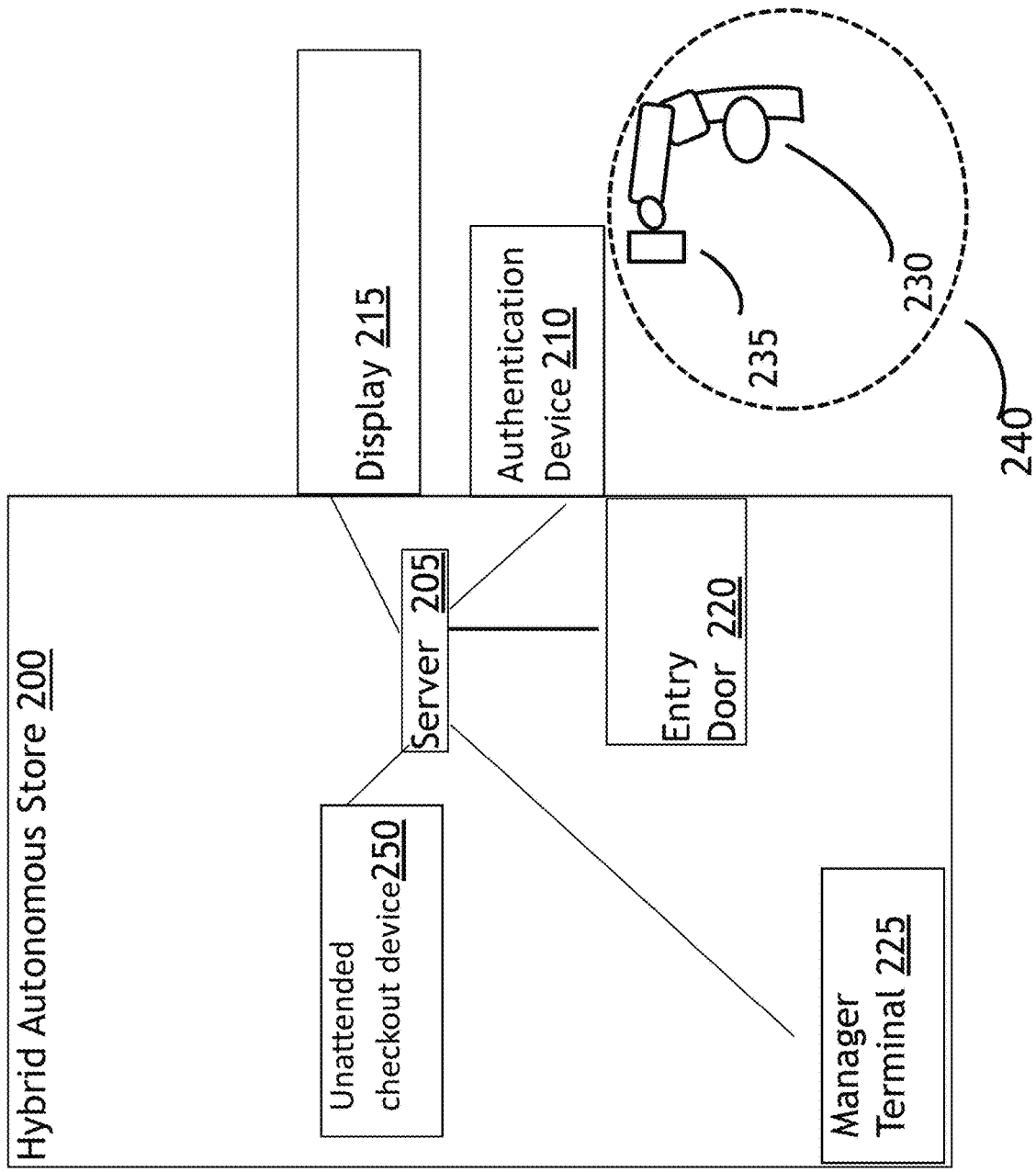
FIG. 2 shows an example of a hybrid autonomous store.

FIG. 2 shows another example of a hybrid autonomous store entry system.

In some implementations, the hybrid autonomous store entry system for a hybrid autonomous store 200 comprises: a server 205; an authentication device 210 coupled to the server 205, wherein the authentication device 210 is configured to obtain personal information from a user's 230 identifying item 235 when the user presents the user's identifying item 235 within an area near entry of the hybrid autonomous store 200 defined by a proximity sensor, wherein the area is visible to a human eye by a colored boundary, wherein the authentication device is configured to transmits the personal information to the server 205, wherein the authentication device 210 is configured to receive authentication of the personal information from the server 205, wherein the user's identifying item 235 can be an phone, a credit card, a membership card, a QR code or the user's biometrics information, wherein the user's biometrics information could come from palm scan, finger scan, Iris scan, or facial recognition scan, wherein the phone is configured to have an application with blue tooth or Wi-Fi-enabled verification, wherein the server 205 is configured to regard the user as a VIP member; a display 215 coupled to the hybrid autonomous store, wherein the display 215 is configured to be viewable to persons outside of the hybrid autonomous store, wherein the display is configured to display promotional information specialized for the user after the authentication of the personal information from the server, wherein the display 215 is configured to display a phrase of "welcome" in language pre-selected by the user; an entry door 220 couple to the hybrid autonomous store 200 and the server 205, wherein the entry door 220 is configured to open when the authentication of the personal information from the server; an unattended checkout device 250 coupled to the server 205, wherein the unattended checkout device 250 is configured to conduct payment process of products the user carries, wherein the unattended checkout device 250 is configured to send a paid message to the server 205 when payment of the products is successful, wherein the VIP member can exit after the said message is received; and a manager terminal 225 coupled to the server 205, wherein the manager terminal 225 is configured to be manned by a person, wherein the manager terminal 225 is configured to checkout the user or communicate with the user when the user chooses to do so, wherein the manager terminal 225 is configured to receive the paid message from, server, wherein the manager terminal 225 is alerted when the user is trying to exit when the paid message is not received from the server, wherein a part of shop that is age restricted is configure to be disabled when the manager terminal 225 is not functional, wherein the manager terminal 225 is configured to process checkout process manually when another user does not present the another user's identifying information, wherein the server regards the another user as "non-VIP" customer.

In some embodiments, the unattended checkout device is configured to process payment from a Bitcoin wallet.

In some embodiments, the pre-determined time is from 8 am to 5 pm.

In some embodiments, the promotional information is configured to meet the user's personal taste.

Figure 3:
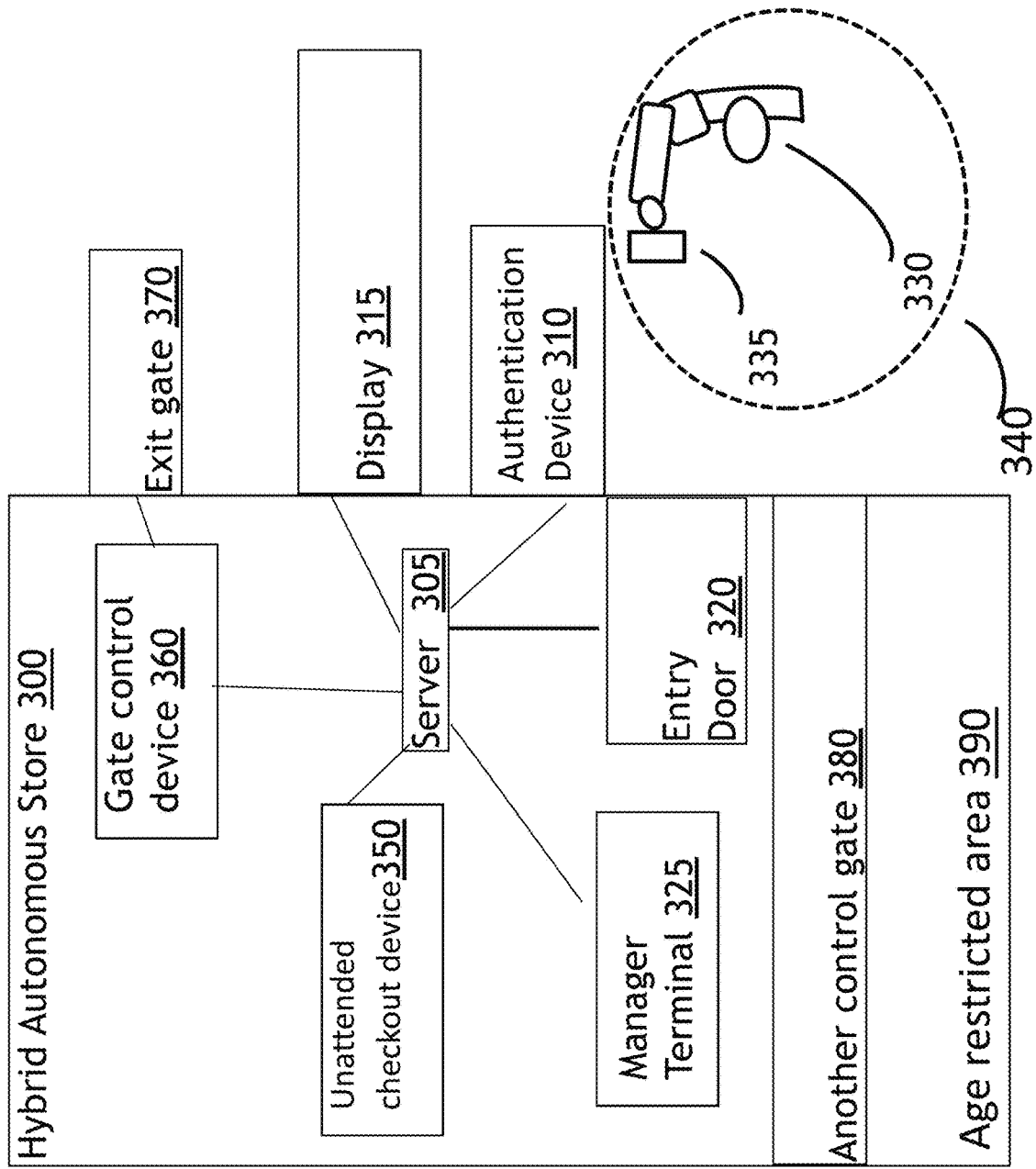
FIG. 3 shows a third example of a hybrid autonomous store.

FIG. 3 shows a third example of a hybrid autonomous store 300.

In some implementations, the hybrid autonomous store 300 comprises: a server 305; an authentication device 310 coupled to the server 305, wherein the authentication device 310 is configured to obtain personal information from a user's 330 identifying item 335 when the user presents the user's identifying item 335 within an area 340 near entry of the hybrid autonomous store 300 defined by a proximity sensor, wherein the area is invisible to a human eye, wherein the authentication device is configured to transmits the personal information to the server, wherein the authentication device is configured to receive authentication of the personal information from the server, wherein the user's identifying item 335 can be an phone, a credit card, a membership card, a QR code or the user's biometrics information, wherein the user's biometrics information could come from palm scan, finger scan, Iris scan, or facial recognition scan, wherein the phone is configured to have an application with blue tooth or Wi-Fi-enabled verification, wherein the server is configured to regard the user as a VIP member; a display 315 coupled to the hybrid autonomous store, wherein the display 315 is configured to be viewable to persons outside of the hybrid autonomous store, wherein the display is configured to display promotional information specialized for the user after the authentication of the personal information from the server, wherein the display is configured to display a phrase of "welcome" in language pre-selected by the user, an entry door 320 couple to the hybrid autonomous store 300 and the server 305, wherein the entry door 320 is configured to open when the authentication of the personal information from the server; an unattended checkout device 350 coupled to the server, wherein the unattended checkout device 350 is configured to conduct payment process of products the user carries, wherein the unattended checkout device 350 is configured to send a paid message to the server when payment of the products is successful; a manager terminal 325 coupled to the server, wherein the manager terminal 325 is configured to be manned by a person, wherein the manager terminal 325 is configured to checkout the user or communicate with the user when the user chooses to do so, wherein the manager terminal 325 is configured to receive the paid message from the server, wherein the manager terminal is alerted when the user is trying to exit when the paid message is not received from the server 305, wherein a part of shop that is age restricted is configure to be disabled when the manager terminal is not functional, wherein the manager terminal is configured to process checkout process manually when another user does not present the another user's identifying information, wherein the server regards the another user as "non-VIP" customer; and a second gate control device 360 coupled to the server, wherein the second gate control device is configured to open an exit gate 370 for the VIP member the server receives the paid message; another control gate 380 coupled to the hybrid autonomous store 300, wherein the another control gate 380 separates an age-restricted area 390 from rest of the smart shop, wherein the another control gate 380 is configured to restrict access to the age-restrict area 390 unless the manager terminal is manned by a person and the personal information shows the user is older than the legal age to access the age-restricted area.

In some embodiments, the unattended checkout device is configured to process payment from a Bitcoin wallet.

In some embodiments, the pre-determined time is from 8 am to 5 pm.

In some embodiments, the promotional information is configured to meet the user's personal taste.

The invention claimed is:

1. A hybrid autonomous store, comprises:
    a server;
    an authentication device coupled to the server, wherein the authentication device is configured to obtain personal information from a user's identifying item when the user presents the user's identifying item within an area near entry of the hybrid autonomous store defined by a proximity sensor, wherein the authentication device is configured to transmits the personal information to the server, wherein the authentication device is configured to receive authentication of the personal information from the server, wherein the user's identifying item can be an phone, a credit card, a membership card, a QR code or the user's biometrics information, wherein the user's biometrics information could come from palm scan, finger scan, Iris scan, or facial recognition scan, wherein the phone is configured to have an application with blue tooth or Wi-Fi-enabled verification, wherein the server is configured to regard the user as a VIP member;

a display coupled to the hybrid autonomous store, wherein the display is configured to be viewable to persons outside of the hybrid autonomous store, wherein the display is configured to display promotional information specialized for the user after the authentication of the personal information from the server, wherein the display is configured to display a phrase of "welcome" in language pre-selected by the user;

an entry door couple to the hybrid autonomous store and the server, wherein the entry door is configured to open when the authentication of the personal information from the server;

an unattended checkout device coupled to the server, wherein the unattended checkout device is configured to conduct payment process of products the user carries, wherein the unattended checkout device is configured to send a paid message to the server when payment of the products is successful;

a manager terminal coupled to the server, wherein the manager terminal is configured to be manned by a person, wherein the manager terminal is configured to checkout the user or communicate with the user when the user chooses to do so, wherein the manager terminal is configured to receive the paid message from the server, wherein the manager terminal is alerted when the user is trying to exit when the paid message is not received from the server, wherein a part of shop that is age restricted is configure to be disabled when the manager terminal is not functional, wherein the manager terminal is configured to process checkout process manually when another user does not present the another user's identifying information, wherein the server regards the another user as "non-VIP" customer; and a second gate control device coupled to the server, wherein the second gate control device is configured to open an exit gate for the VIP member the server receives the paid message.

2. The hybrid autonomous store of claim 1, wherein the unattended checkout device is configured to process payment from a Bitcoin wallet.

* * * * *